(12) United States Patent
Farley et al.

(10) Patent No.: US 8,774,829 B2
(45) Date of Patent: Jul. 8, 2014

(54) SENSOR NODE POSITIONING FOR LOCATION DETERMINATION

(75) Inventors: Richard O. Farley, San Diego, CA (US); Dimosthenis Kaleas, Carlsbad, CA (US); Gianni Giorgetti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 466 days.

(21) Appl. No.: 12/837,589

(22) Filed: Jul. 16, 2010

(65) Prior Publication Data

US 2012/0015665 A1   Jan. 19, 2012

(51) Int. Cl.
*H04W 24/00*   (2009.01)

(52) U.S. Cl.
USPC ........................................ 455/456.1; 455/522

(58) Field of Classification Search
USPC ............. 705/12, 22; 455/456.1, 456.3, 456.4, 455/13.4, 522, 571–574
See application file for complete search history.

(56) References Cited

U.S. PATENT DOCUMENTS

| | | | |
|---|---|---|---|
| 5,910,776 A | 6/1999 | Black | |
| 2003/0233280 A1* | 12/2003 | Haulk et al. | 705/22 |
| 2006/0095331 A1* | 5/2006 | O'Malley et al. | 705/22 |
| 2007/0217379 A1 | 9/2007 | Fujiwara et al. | |
| 2008/0008119 A1* | 1/2008 | Alizadeh-Shabdiz | 370/328 |
| 2009/0027272 A1 | 1/2009 | Don Carlos | |
| 2009/0128412 A1 | 5/2009 | Ryu et al. | |
| 2009/0131081 A1* | 5/2009 | Abdel-Kader et al. | 455/456.6 |
| 2009/0201850 A1 | 8/2009 | Davis et al. | |

FOREIGN PATENT DOCUMENTS

WO   WO2009106686 A1   9/2009

OTHER PUBLICATIONS

International Search Report and Written Opinion—PCT/US2011/044173—ISA/EPO—Oct. 14, 2011.

* cited by examiner

*Primary Examiner* — Chuong A Ngo
(74) *Attorney, Agent, or Firm* — Jeffrey D. Jacobs

(57) ABSTRACT

Systems, methods, and devices are described for determining a physical location of a wireless device. A receiver may be configured to receive associations between anchor locations and sensor nodes, wherein each sensor node uses near field communications to identify an anchor location. The receiver may also receive signal strength measurements from the wireless device measuring the signal strength of wireless sensor nodes. Arrangements may also be configured to determine physical locations of the sensor nodes based on physical locations of anchor locations and utilize received signal strength measurements with the determined physical locations of the sensor nodes to determine the physical location of the wireless device.

42 Claims, 11 Drawing Sheets

SENSOR NODE POSITIONING FOR LOCATION DETERMINATION

BACKGROUND

The following generally relates to positioning, and more specifically, but not by way of limitation, to indoor position determination of a mobile device.

Current smart phones feature a rich set of sensors and include GPS receivers. The ability to sense the phone's environment and its position has enabled a multitude of context-aware and Location Based Services (LBS). However, in the future, users may desire expanded abilities to gather knowledge from their surroundings, interact with a variety of consumer electronic devices, and obtain accurate location information, both outdoors and indoors.

In the past few years, indoor positioning has received a great deal of attention both from the research community and the industry. Systems that use signals transmitted by Wi-Fi routers or cellular towers may leverage existing infrastructures. But they may rely on networks that are not designed to support positioning; therefore, they may not be easy to expand and often can only provide coarse resolution unless they are calibrated using extensive measurement campaigns. Ultra-Wide Band (UWB) systems based on Time Difference of Arrival (TDoA) provide high accuracy, but may entail the use of expensive infrastructures.

As noted, solutions typically propose the use of reference devices. Position determination may be performed by collecting measurements from such reference devices (e.g., routers). These devices may be required to work continuously, and their positions accurately known to the system. Some types of reference devices are not permanently anchored, and there may be challenges to "self-localize" the position of these devices. In many cases, the location of each reference device may be manually annotated at deployment time. Clearly, this approach can be time-consuming and prone to errors. Additionally, there is the potential that some of the reference devices may be unplugged or replaced due to maintenance and plugged in in undesired locations. There may, therefore, be a need in the art to address one or more of the above issues with novel techniques for position determination.

SUMMARY

The described features generally relate to one or more improved systems, devices, methods, and/or apparatuses for wireless position determination. A positioning system may use an array of sensor nodes that transmit beaconing signals. These beaconing signals may be received by a wireless device that is attached to an asset that is desired to be tracked (such as an employee, pet, computer, paper file, delivery cart, etc.). The wireless device may measure the received signal strength (RSS) of the beaconing signal. These RSS measurements may then be transmitted to a computer system. The computer system, using the RSS measurements, may be able to determine or estimate the location of the wireless device in real time or near real time. Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

An example of a server computer system for determining a physical location of a wireless device may be provided. The system may include memory configured to store a mapping of physical locations of a plurality of anchor locations; a receiver configured to receive a plurality of associations between each of at least a subset of the mapped anchor locations and selected sensor nodes of a plurality of sensor nodes, wherein each sensor node uses near field communication to identify the associated anchor location; the receiver configured to receive signal strength measurements from the wireless device measuring the signal strength at the wireless device of wireless transmissions from the selected sensor nodes; a positioning engine, communicatively coupled with the memory and the receiver module, configured to determine a physical location for each of the selected sensor nodes based at least in part on the mapping; and the positioning engine configured to utilize the received signal strength measurements with the determined physical locations of the selected sensor nodes to determine the physical location of the wireless device.

Examples of an access terminal may include one or more of the following features described in this paragraph. The positioning engine may be further configured to track the physical location of the wireless device from a first physical location to a second physical location. The server computer system may further comprise an external interface configured to output the physical location of the wireless device determined by the positioning engine substantially in real time. The server computer system may further comprise an external interface configured to output the physical location of the wireless device positioned on a layout of a physical area, wherein each of the physical locations of the plurality of anchor locations is linked to a location on the layout of the physical area. The near field communications may utilize an RFID tag to identify the associated anchor location. The server computer system may further comprise a coordinator module configured to receive the plurality of associations between each of at least the subset of the mapped anchor locations and selected sensor nodes of the plurality of sensor nodes from the selected sensor nodes. The plurality of associations between each of at least the subset of mapped anchor locations and selected sensor nodes of the plurality of sensor nodes may be transmitted by the coordinator module to the receiver module via at least one power line. The receiver module may be further configured to receive elevation measurements from the wireless device. The plurality of anchor locations may be coupled with electrical outlets and the plurality of sensor nodes are configured to be plugged into electrical outlets.

An example of a method of determining physical locations of sensor nodes may be provided. The method may include storing a mapping of physical locations of a plurality of anchor locations; receiving a plurality of associations between each of at least a subset of the mapped anchor locations and selected sensor nodes of a plurality of sensor nodes, wherein each sensor node uses near field communications to identify the associated anchor location; receiving signal strength measurements from a wireless device measuring the signal strength at the wireless device of wireless transmissions from the selected sensor nodes; determining a physical location for each of the selected sensor nodes based on the mapping;

Examples of the method may include one or more of the following features described in this paragraph. The method may further comprise determining a physical location of the wireless device, wherein the determination utilizes the received signal strength measurements with the determined physical locations of the selected sensor nodes. The method may further comprise tracking the physical location of the wireless device from a first physical location to a second physical location. The method may further comprise outputting the physical location of the wireless device determined by the positioning engine substantially in real time. The method may further comprise outputting the physical location of the wireless device positioned on a layout of a physical area, wherein each of the physical locations of the plurality of anchor locations is linked to a location on the layout of the physical area. The near field communications may utilize an RFID tag to identify the associated anchor location. The method may further comprise receiving the plurality of associations between each of at least the subset of the mapped anchor locations and selected sensor nodes of the plurality of sensor nodes from the selected sensor nodes. The plurality of associations between each of at least the subset of mapped anchor locations and selected sensor nodes of the plurality of sensor nodes are transmitted via at least one power line. The method may further comprise receiving elevation measurements by the computer system from the wireless device. The method may further include receiving barometric sensor measurements from a subset of the plurality of sensor nodes, wherein the subset of nodes have barometric pressure sensors to establish a reference elevation measurement for use with the received elevation measurements.

An example of a computer program product residing on a processor-readable medium and comprising processor-readable instructions configured to cause a processor to execute various instructions may be present. The instructions may include instructions to store a mapping of physical locations of a plurality of anchor locations; receive a plurality of associations between each of at least a subset of the mapped anchor locations and selected sensor nodes of a plurality of sensor nodes, wherein each sensor node uses near field communication to identify the associated anchor location; receive signal strength measurements from a wireless device measuring the signal strength at the wireless device of wireless transmissions from the selected sensor nodes; determine a physical location for each of the selected sensor nodes based on the mapping; and determine a physical location of the wireless device, wherein the determination utilizes the received signal strength measurements with the determined physical locations of the selected sensor nodes.

Examples of the method may include one or more of the following features described in this paragraph. The computer program product may further comprise processor-readable instructions configured to cause the processor to track the physical location of the wireless device from a first physical location to a second physical location. The computer program product may further comprise processor-readable instructions configured to cause the processor to output the physical location of the wireless device determined by the positioning engine substantially in real time. The computer program product may further comprise processor-readable instructions configured to cause the processor to output the physical location of the wireless device positioned on a layout of a physical area, wherein each of the physical locations of the plurality of anchor locations is linked to a location on the layout of the physical area. The near field communications may utilize an RFID tag to identify the associated anchor location. The computer program product may further comprise processor-readable instructions configured to cause the processor to receive the plurality of associations between each of at least the subset of the mapped anchor locations and selected sensor nodes of the plurality of sensor nodes from the selected sensor nodes. The computer program product further comprises processor-readable instructions configured to cause the processor to receive elevation measurements from the wireless device.

An example of a device for determining a physical location of a wireless device may be present. The device may include: means for storing a mapping of physical locations of a plurality of anchor locations; means for receiving a plurality of associations between each of at least a subset of the mapped anchor locations and selected sensor nodes of a plurality of sensor nodes, wherein each sensor node uses near field communication to identify the associated anchor location; means for receiving signal strength measurements from the wireless device measuring the signal strength at the wireless device of wireless transmissions from the selected sensor nodes; means for determining a physical location for each of the selected sensor nodes based on the mapping; and means for determining the physical location of the wireless device, wherein the determination utilizes the received signal strength measurements with the determined physical locations of the selected sensor nodes.

Examples of the device may include one or more of the following features described in this paragraph. The device may further comprise means for tracking the physical location of the wireless device from a first physical location to a second physical location. The device may comprise means for outputting the physical location of the wireless device determined by the positioning engine substantially in real time. The device may further comprise means for outputting the physical location of the wireless device positioned on a layout of a physical area, wherein each of the physical locations of the plurality of anchor locations is linked to a location on the layout of the physical area. The device may further comprise means for receiving the plurality of associations between each of at least the subset of the mapped anchor locations and selected sensor nodes of the plurality of sensor nodes from the selected sensor nodes. The device may further comprise means for receiving pressure sensor measurements from the wireless device and from a subset of the plurality of sensor nodes, and means for calculating elevation measurements using the received measurements. The plurality of anchor locations may be coupled with electrical outlets and the plurality of sensor nodes are configured to be plugged into electrical outlets.

An example of a system for determining a physical location of a wireless device may be present. The system may include: a plurality of sensor nodes, wherein each sensor node is configured to identify an associated anchor location using near field communications; transmit an association between a mapped anchor location and the sensor node to a computer system; transmit wireless transmissions to the wireless device; the system may also include the wireless device, configured to: receive wireless transmissions from selected sensor nodes of the plurality of sensor nodes; and transmit signal strength measurements to the computer system measuring the signal strength at the wireless device of wireless transmissions from the selected sensor nodes; and the system may include the computer system, configured to: store a mapping of physical locations of the plurality of anchor locations; receive a plurality of associations between each of at least a subset of the mapped anchor locations and selected sensor nodes of the plurality of sensor nodes; receive signal strength measurements from the wireless device measuring the signal strength at the wireless device of wireless transmissions from the selected sensor nodes; determine a physical location for each of the selected sensor nodes based on the association between the mapped anchor location and the sensor node; and determine the physical location of the wireless device, wherein the determination utilizes the received signal strength measurements and the determined physical locations of the selected sensor nodes.

Examples of the system may include one or more of the following features described in this paragraph. The positioning engine of the computer system may be further configured to track the physical location of the wireless device from a first physical location to a second physical location. The computer system may further comprise an external interface configured to output the physical location of the wireless device determined by the positioning engine substantially in real time. The computer system may further comprise an external interface configured to output the physical location of the wireless device positioned on a layout of a physical area, wherein each of the physical locations of the plurality of anchor locations is linked to a location on the layout of the physical area. The near field communications may utilize an RFID tag to identify the associated anchor location. The computer system may further comprise a coordinator module configured to receive the plurality of associations between each of at least the subset of the mapped anchor locations and selected sensor nodes of the plurality of sensor nodes from the selected sensor nodes. The plurality of associations between each of at least the subset of mapped anchor locations and selected sensor nodes of the plurality of sensor nodes may be transmitted by the coordinator module to the receiver module via at least one power line. The receiver module of the computer system may be further configured to receive elevation measurements from the wireless device. The plurality of anchor locations may be electrical outlets and the plurality of sensor nodes are configured to be plugged into electrical outlets.

BRIEF DESCRIPTION OF THE DRAWINGS

In the appended figures, similar components and/or features may have the same reference label. Further, various components of the same type may be distinguished by following the reference label with a dash and a second label that distinguishes among the similar components. If only the first reference label is used in the specification, the description is applicable to any one of the similar components having the same first reference label irrespective of the second reference label.

DETAILED DESCRIPTION

Figure 1:
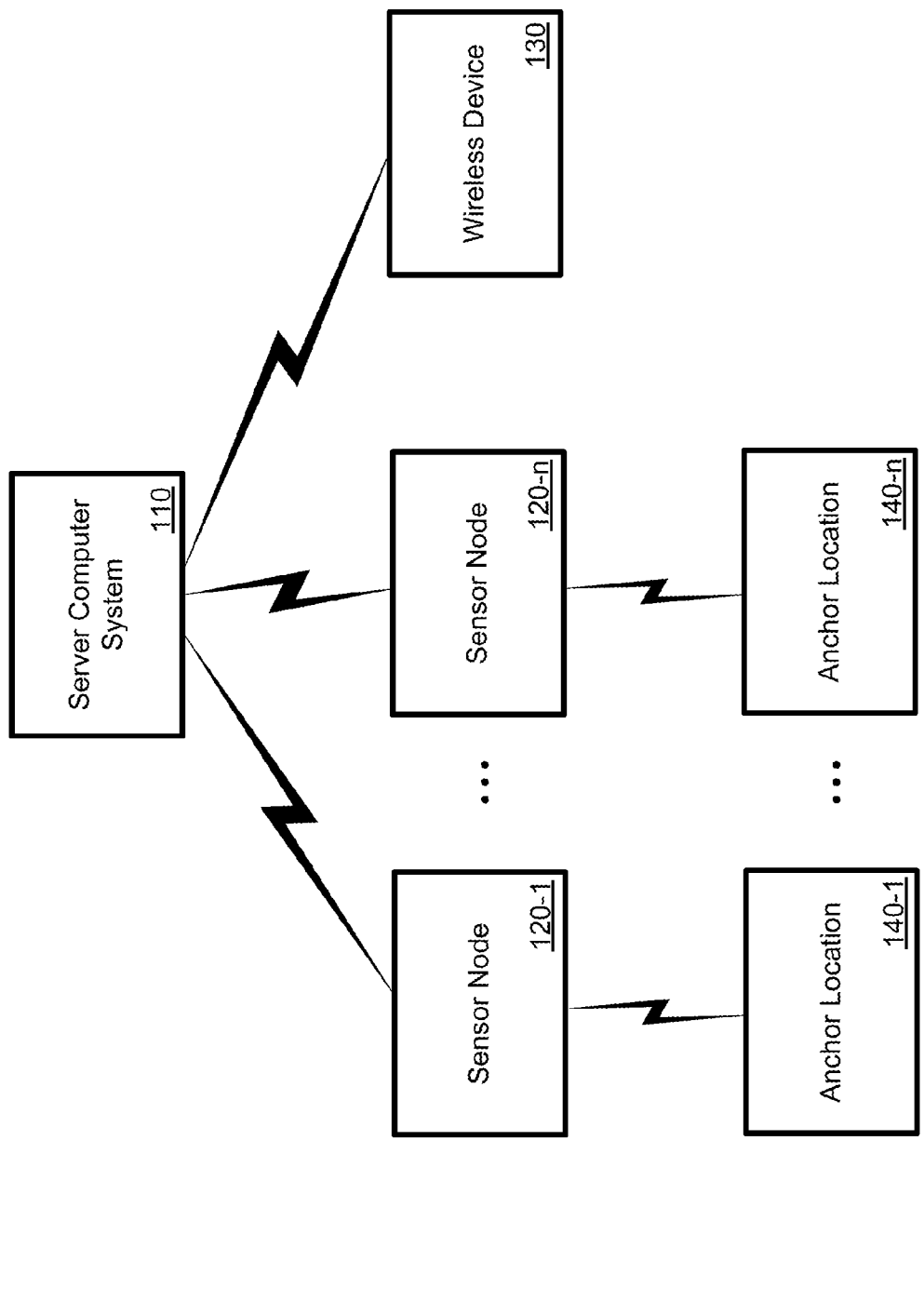
FIG. 1 illustrates a system for determining a physical location of one or more sensor nodes and wireless devices.

An indoor positioning system may use an array of sensor nodes that transmit beaconing signals. These beaconing signals may be received by a wireless device that is attached to an asset that is desired to be tracked (such as an employee, pet, computer, paper file, delivery cart, etc.). The wireless device may measure the received signal strength (RSS) of the beaconing signal. These RSS measurements may then be transmitted to a computer system. The computer system, using the RSS measurements, may be able to determine or estimate the location of the wireless device in real time or near real time.

In order for the computer system to determine the location of the wireless device, however, it may first need to determine the physical locations of the sensor nodes that transmitted the beaconing signals to the wireless device. One possible way to do this would be to scatter the sensor nodes throughout the area where the wireless device will be tracked, then manually indicate to the computer system the location of each sensor node. For example, this may involve a user indicating on a layout of a physical area (e.g., a map or floor plan) where each sensor node is located. Such an arrangement, however, may introduce human error: the user may indicate incorrect locations of sensor nodes; the user may accidentally swap the locations of the two sensor nodes; and/or the user may not be precise enough in providing the location of each sensor node. Each of these situations may result in decreased accuracy in the ability of the computer system to accurately determine the location of the wireless device.

Besides initial setup, later problems may occur: a sensor node may need to be replaced (e.g., because it is malfunctioning); the user or a third party may (purposefully or unintentionally) move a sensor node to another location; and/or a sensor node may lose power (e.g., be unplugged), to name only a few possibilities. Again, each of these situations may adversely affect the ability of the computer system to accurately determine the location of a wireless device using the sensor nodes.

Instead, anchor locations may be used to determine the location of sensor nodes. An anchor location may be a device attached to a physical location that provides a sensor node with an identifier or an indication of its location, which the sensor node may transmit to a computer system. An exemplary anchor location may be an RFID tag attached to an electrical outlet. When a sensor node is located in the vicinity of an anchor location (such as plugged into the outlet in which the anchor location is affixed or otherwise attached), the sensor node may receive the anchor location's identifier from the anchor location. This anchor location may be transmitted to the computer system by the sensor node. The computer system may then use the anchor location to determine the location of the sensor node. If the anchor location is transmitted to the sensor node in the form of an identifier, the computer system may use a stored table, database, or other storage arrangement that associates the anchor location's identifier with a physical location. In an exemplary arrangement, the computer system may have access to a physical layout of an area that contains the position of all (or a substantial portion of) the anchor locations within the area where the wireless device will be tracked.

FIG. 1 illustrates a block diagram of system 100 for determining a physical location of one or more wireless devices and sensor nodes. System 100 may include a server computer system 110, a number of sensor nodes (120-1 through 120-*n*), a wireless device 130, and a number of anchor locations (140-1 through 140-*n*). In system 100, anchor locations 140-1 through 140-*n* may be attached to various physical locations. For example, anchor locations 140-1 through 140-*n* may include, or be attached to, electrical outlets. In another example, anchor locations 140-1 through 140-*n* may be attached to walls, floors, power strips, etc. Notably, some anchor locations of anchor locations 140-1 through 140-*n* may be attached to one type of object, while other anchor locations of anchor location 140-1 through 140-n may be attached to other types of objects. In some examples, anchor locations 140 are located indoors.

In some situations, anchor locations 140-1 through 140-n will be attached to objects that are unlikely to move. The attachment of an anchor location 140 to an object may be done in a semi-permanent or permanent way. For example, anchor locations 140-1 through 140-n may be attached (or affixed, coupled with, etc.) using an adhesive. Each anchor location may be in the form of a sticker. While it may be possible to detach such a sticker and reposition it elsewhere, this may be difficult to do without substantial effort. It may also be possible that anchor locations 140 are nailed, screwed, or otherwise bonded or attached to objects.

Each of anchor locations 140-1 through 140-n may be associated with unique identifiers. This identifier may be different than the identifiers stored at other anchor locations 140. The identifier associated with each anchor location 140 may be linked to a physical location. For example, when anchor locations 140 are initially attached to objects, a physical layout of the area where the user is placing the anchor locations 140 may be created or accessed by the user. This physical layout may show some or all objects typically present on a floor plan, such as walls, doors, windows, outlets, desks, chairs, etc. The identifier of each anchor location 140-1 through 140-n may be linked to a location on the physical layout. This mapping may then be provided to server computer system 110. As such, server computer system 110 has access to the physical location of each anchor location 140.

Each anchor location 140 may include a transmitter capable of transmitting the anchor location's identifier. Anchor locations 140 may use a near field communication protocol to transmit its location or identifier. For example, anchor locations 140 may include an RFID tag. If an RFID tag is used, it may only be possible to read the identifier transmitted by the anchor location within a short distance.

Sensor nodes 120-1 through 120-n may each be placed in the vicinity of an anchor location of anchor locations 140. Each sensor node 120 may (wirelessly) receive the identifier or location from the anchor location 140 that is in its vicinity. For example, if anchor locations 140 are attached to electrical outlets, sensor nodes 120-1 through 120-n may be plugged into those outlets. Of note, more anchor locations 140 may exist than sensor nodes 120. Returning to the electrical outlet example, an anchor location 140 may be attached with every outlet in a building; however, sensor nodes 120 may be present at only a small (or large) percentage of these outlets.

Upon receiving power, or at some other interval, each sensor node 120-1 through 120-n may receive the identifier of an anchor location 140 in its vicinity. This may involve the sensor node 120 reading the RFID tag of the respective anchor location 140. Each sensor node 120 may store the identifier associated with the anchor location 140 in its vicinity. If no anchor location 140 is in the vicinity of a sensor node 120, the sensor node 120 may sit idle, enter a sleep mode, or continue to attempt to receive an identifier from an anchor location 140 until successful.

After receiving an identifier from an anchor location 140, each of sensor nodes 120-1 through 120-n may transmit the identifier received to server computer system 110. Sensor nodes 120 may each also transmit an identifier (such as a MAC address) linked to the respective sensor node. Therefore, server computer system 110 may receive one or more messages from a sensor node 120 that indicates: 1) which sensor node 120 transmitted the message, and 2) what anchor location of anchor locations 140-1 through 140-n is in the vicinity. If a sensor node 120 is farther from server computer system 110 than some other sensor node 120, it may relay messages to server computer system 110 via one or more other sensor nodes 120.

Server computer system 110 may have a stored mapping of the physical location where anchor locations 140-1 through 140-n have been distributed and attached to objects. This mapping may indicate where each anchor location 140, based on the anchor location's identifier, is located. Using this mapping, server computer system 110 may be able to determine the location of each sensor node 120. For example, if one or more messages are received by the server computer system 110 indicating an identifier for sensor node 120-1 (e.g., a MAC address) and the identifier (e.g., RFID tag identifier) for anchor location 140-1, server computer system 110 may determine the location of sensor node 120-1 based on the stored location of anchor location 140-1 in the mapping. Further, if for some reason, sensor node 120-1 is moved to a new position, such as to the location of anchor location 140-n, the server computer system 110 may be able to determine the new location of sensor node 120-1 using the mapping containing the locations of the anchor locations 140 and one or more messages received from sensor node 120-1 that identify itself and the new anchor location 140 in its vicinity.

System 100 may also include one or more wireless devices, such as wireless device 130. Wireless device 130 may be attached or otherwise coupled with an object or entity that is desired to be tracked. For example, wireless device 130 may be attached with a person (e.g., an employee, child, elderly person, patient, etc.) or an asset (e.g., a computer, file, inventory, art, expensive item, forklift, cart, etc.). As those with skill in the art will recognize, the types of objects or entities that may wish to be tracked are near limitless and the previous examples are non-limiting.

Wireless device 130 may be configured to receive wireless signals from sensor nodes 120-1 through 120-n. Wireless device 130 may receive wireless signals from one or more sensor nodes 120 during roughly the same period of time. As the location of wireless device 130 changes, the sensor nodes 120 that wireless device 130 receives wireless signals from may vary. The wireless signals received by wireless device 130 may be referred to as beaconing signals. Each sensor node of sensor nodes 120-1 through 120-n may periodically transmit a beaconing signal. Such a beaconing signal may include an identifier (such as a MAC address) that indicates which sensor node 120 is transmitting the beaconing signal. Wireless device 130 may be configured to measure the received signal strength (RSS) of the beaconing signal received from the sensor nodes 120. Wireless device 130 may store the RSS measurements and the identifier that indicates the sensor node 120 that transmitted the beaconing signal. Wireless device 130 may periodically (such as once per second) transmit the collected RSS data and the identifier indicating which sensor node of sensor nodes 120-1 through 120-n the RSS measurement is associated with to server computer system 110. Wireless device 130 may transmit RSS measurements and associated identifiers for multiple sensor nodes 120 to the server computer system 110 at the same time or substantially at the same time.

In an exemplary wireless device 130, a JN5139 wireless microcontroller is used. The output power of the wireless device is +2.5 dBm and uses an on-board ceramic antenna. The current consumption is roughly 37 mA when in transmit/receive mode. When in sleep mode, which may be entered when the wireless device is not moving, power consumption may drop to 2.6 uA. Such a wireless device may only be able to communicate with other devices within a range of roughly twenty to thirty meters indoors.

Wireless device 130 may also include an accelerometer, such as a single tri-axial accelerometer. Such an accelerometer, in conjunction with an algorithm, may allow for the wireless device to determine various activities being performed by the entity or object the wireless device is attached to. For example, if the wireless device is attached to a person, the activities the accelerometer can determine may include: walking, running, fidgeting, and remaining motionless. The activity determined by wireless tag 130 may be transmitted back to the server computer system 110 as a separate message or part of the RSS measurement transmissions.

The use of an accelerometer may serve to decrease power use. Wireless device 130 may disable its receiver/transmitter when the accelerometer determines wireless device 130 is motionless or fidgeting. Wireless device 130 may only receive beaconing data when wireless device 130 is determined by the accelerometer to be moving. Therefore, wireless device 130 may only transmit RSS measurements to server computer system 110 when its position needs updating. Only transmitting RSS measurements to server computer system 110 when wireless device 130 is in motion or has moved may also increase the number of wireless devices 130 that may be tracked because the bandwidth used by each wireless device 130 will be decreased.

Based upon the RSS measurements and the associated identifiers indicating which sensor node the RSS measurements are linked to, the server computer system 110 may be able to determine the location of wireless device 130. For server computer system 110 to determine the location of wireless device 130, it may be necessary for the wireless device 130 to transmit at least two or three RSS measurements linked to different sensor nodes. While system 100 illustrates only wireless device 130, it should be understood that server computer system 110 may track the location of many wireless devices 130.

In addition to wireless device 130 receiving beaconing signals from a sensor node 120, other sensor nodes 120 may receive beaconing signals. Periodically, the RSS of this signal may be measured and stored. After one or several of these measurements have been taken, the RSS measurement gathered by the receiving sensor node 120 regarding the RSS from transmitting sensor nodes 120 may be transmitted to server computer system 110. This RSS measurement may be used by server computer system 110 to determine the location of wireless device 130.

Figure 2:
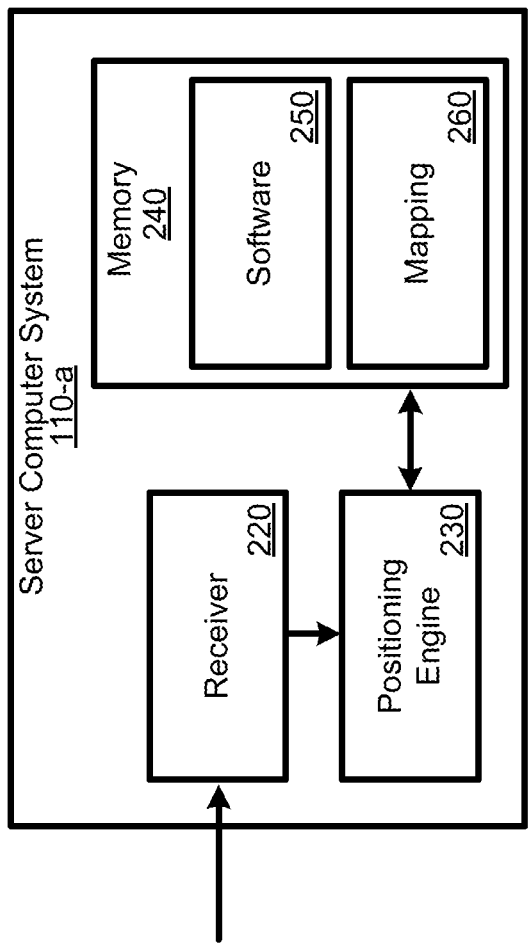
FIG. 2 illustrates an exemplary server computer system.

Server computer system 110 may contain various physical or virtual components configured to determine the location of sensor nodes 120 and wireless devices 130. Server computer system 110-a of FIG. 2 illustrates an exemplary server computer system. Server computer system 110-a may represent the same server computer system as server computer system 110 of FIG. 1. Alternatively, server computer system 110-a may represent some other computer system. Server computer system 110-a may include a receiver 220, a positioning engine 230, and a memory 240, which may store software 250 and mapping 260.

Receiver 220 may receive transmissions from sensor nodes and/or wireless devices, such as sensor nodes 120-1 through 120-n and wireless device 130 of FIG. 1. Receiver 220 may be configured to receive the associations between sensor nodes and anchor locations. Receiver 220 may also be configured to receive wired communications, or wireless signals from wireless devices. The wireless signals from wireless devices may include RSS measurements and an indication of which wireless node transmitted the beaconing data on which the RSS measurement is based. Receiver 220 may include a wireless interface configured to communicate wirelessly with sensor nodes and wireless devices. Receiver 220 may store the RSS measurements it receives, along with the associated identifiers, in a database.

Positioning engine 230 may receive data from receiver 220. Positioning engine 230 may also communicate with memory 240. Positioning engine 230 may determine the physical location of sensor nodes by using a mapping that identifies the physical location of anchor locations. Based on which anchor location a sensor node identifies as in its vicinity, positioning engine 230 may be able to determine the location of the sensor node. Positioning engine 230 may also be able to determine the location of wireless devices 130 based on the RSS data received from the wireless devices. Positioning engine 230 may use the RSS data in conjunction with what sensor node broadcast the beaconing data on which the RSS data is based, and the location of the sensor node (which was determined using the anchor location in the vicinity of the sensor node and mapping 260), to determine the location of the wireless device and/or track the wireless device between various locations.

Positioning engine 230 may access memory 240. Memory 240 may represent a tangible computer-readable storage device, such as a hard drive or random access memory. It should be understood that while memory 240 is illustrated as part of server computer system 110-a, it may be physically located at some other location and may be accessed via a network. Memory 240 may store software 250. Software 250 may execute various functions of receiver 220 and positioning engine 230. It may be possible to perform all functions of receiver 220 and/or positioning engine 230 using software. Also stored in memory 240 may be mapping 260. Mapping 260 may identify the location of anchor locations on a layout of a physical area. For example, mapping 260 may be a floor plan of a building. This floor plan may have associated with it coordinates that identify where each anchor location is located. Each anchor location may be identified by its identifier (such as its RFID tag identifier). Each identifier for anchor locations may be unique from other anchor location identifiers in the same mapping.

Mapping 260 may be created at least partly by a user. For example, after or during anchor locations being attached to various fixed locations (or objects that are expected to remain in fixed locations), the user may input where the anchor locations are located to the mapping. For example, the user may input a floor plan, and then select a location where an anchor location is located. The user may then enter the identifier associated with that anchor location. The user may repeat this process until each anchor location has been inputted. This mapping may then remain valid for as long as the anchor locations remain static, or until new anchor locations need to be added to the mapping. It may be possible for a user to edit the mapping as necessary. Once server computer system 110-a determines the location of sensor nodes (based on the anchor locations), the location of the sensor nodes may be incorporated with mapping 260 or stored separately, such as in a separate table or database.

Figure 3:
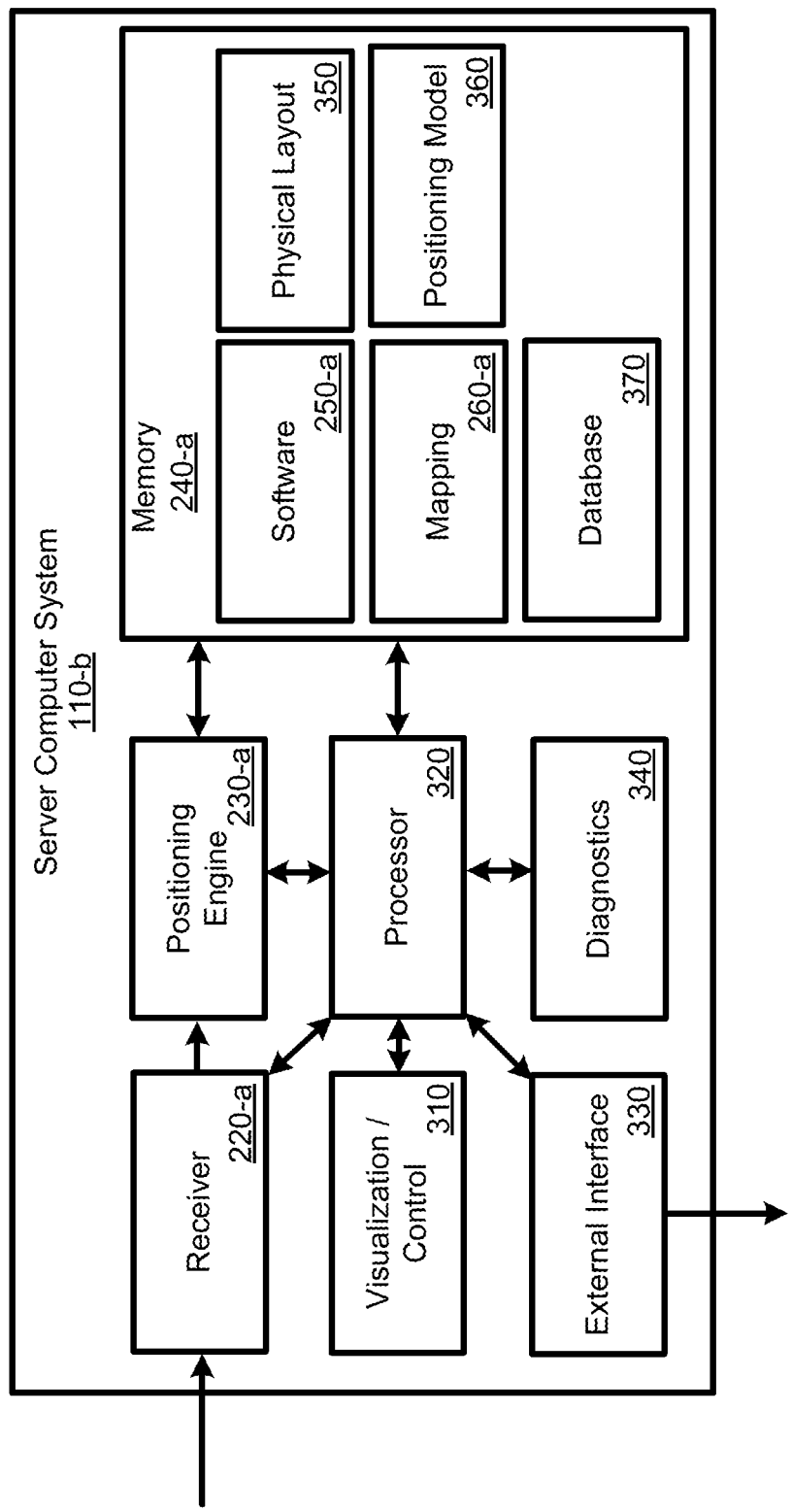
FIG. 3 illustrates another exemplary server computer system.

Server computer system 110-a may also include other components. FIG. 3 illustrates another exemplary server computer system. Computer server system 110-b may represent the same server computer system as server computer system 110-a of FIG. 2 or server computer system 110 of FIG. 1. Alternatively, computer system 110-b may represent some other server computer system. Computer system 110-b may contain: receiver 220-a, positioning engine 230-a, visualization and control 310, processor 320, external interface 330, diagnostics 340, memory 240-a, software 250-a, mapping 260-a, physical layout 350, positioning model 360, and anchor location database 370.

Receiver 220-a may represent the same receiver as receiver 220 of FIG. 2 and may perform substantially the same functions. Alternatively, receiver 220-a may represent some other receiver. Similarly, positioning engine 230-a may represent the same positioning engine as positioning engine 230 of FIG. 2 and may perform substantially the same functions. Alternatively, positioning engine 230-a may represent some other positioning engine.

Processor 320 may represent a computer processor. This processor may interact with other modules of computer system 110-b, such as receiver 220-a, positioning engine 230-a, visualization and control 310, external interface 330, diagnostics 340, and memory 240-a. Processor 320 may serve as the interface between various modules or may execute instructions for each module. Each module may, at least in part, be executed using processor 320.

Visualization and control 310 may create an interface appropriate to be presented to a user. Visualization and control 310 may allow the user to view real time or near real time position information for one or more objects with a wireless device attached thereto. Visualization and control 310 may use (animated) location traces to display the location of a wireless device. For example, if a wireless device is attached to a person, the animated location trace may show a picture of the person. Visualization and control 310 may also allow a user to interact with diagnostics 340. Such diagnostics 340 may evaluate the status of wireless devices and/or sensor nodes to troubleshoot problems.

External interface 330 may work in conjunction with visualization and control 310 to allow a user to interact with server computer system 110-b. External interface 330 may allow a user to interact with server computer system 110-b via a web interface accessible via a network, such as the Internet or a corporate intranet. External interface 330 may allow the user to interact with server computer system 110-b in other ways. For example, external interface 330 may allow a user to interact with server computer system 110-b via a keyboard, mouse, and/or display local to the server computer system 110-b. Also, external interface 330 may allow mobile devices (such as via a wireless cellular service provider's network) to interact with server computer system 110-b.

Memory 240-a may represent the memory 240 of FIG. 2 and may perform substantially the same functions. Alternatively, memory 240-a may represent some other memory. Similarly, software 250-a may represent software 250 of FIG. 2 and may perform substantially the same functions. Alternatively, software 250-a may represent some software other than software 250. Software 250-a may be used to implement some or all of: receiver 220-a, positioning engine 230-a, visualization and control 310, external interface 330, and diagnostics 340. Mapping 260-a may represent the same mapping as mapping 260 of FIG. 2 and may perform substantially the same functions. Alternatively, memory 260-a may represent some other mapping.

While mapping 260-a may store the relationships between anchor locations and their physical positions, physical layout 350 may store a map (such as a floor plan) which may be presented to a user with locations of wireless devices superimposed. Physical layout 350 may store the location of sensor nodes. Mapping 260-a and physical layout 350 may be combined into one map or floor plan. In may be possible to determine or estimate a physical layout based on where wireless devices typically are moving and where wireless devices are stationary. For example, an area of a physical layout where a wireless device is typically in motion may be determined to be a corridor.

Positioning model 360 may be used to determine a distance from a sensor node to a wireless device based on the RSS measurements taken by the wireless device. Positioning model 360 may be created by sensor nodes receiving beaconing signals from other sensor nodes and measuring the RSS of these beaconing signals. These RSS measurements may be used to periodically (such as every five minutes) calibrate the positioning model, allowing for the position of wireless devices to be determined with greater accuracy. For example, signal strength may not decrease predictably as the distance between a sensor node and a wireless device increases or stays constant if the distance between the sensor node and the wireless device stays constant. For example, an obstacle (e.g., a wall, file cabinet, electrical fixture, etc.) that comes between a wireless device and a sensor node may result in a sudden decrease in the RSS measurements. Alternatively, the presence of a long corridor may allow beaconing signals to propagate with little loss in the direction of the corridor. A positioning model 360 may allow such obstacles to be factored into the calculation of the distance from the sensor node to the wireless device (and thus the location of a wireless device) and, therefore, increase the precision with which the position of the wireless device is determined. Further, because periodically the positioning model 360 is updated, the server computer system 110-b may be able to provide an accurate location of a wireless device despite the presence of obstacles that affect the transmission of wireless signals being rearranged in the area where the wireless device is being tracked.

Database 370 may store the current and/or previous positions of wireless devices. It may be desired that where a wireless device has traveled over some period of time be retained for future reference. Database 370 may store the location data of some or all wireless devices monitored by the wireless sensor network communicating with server computer system 110-b. Additionally, information may also be stored in database 370. For example, it may store how much time the wireless device remains stationary or in a particular location, such as the cafeteria.

Figure 4:
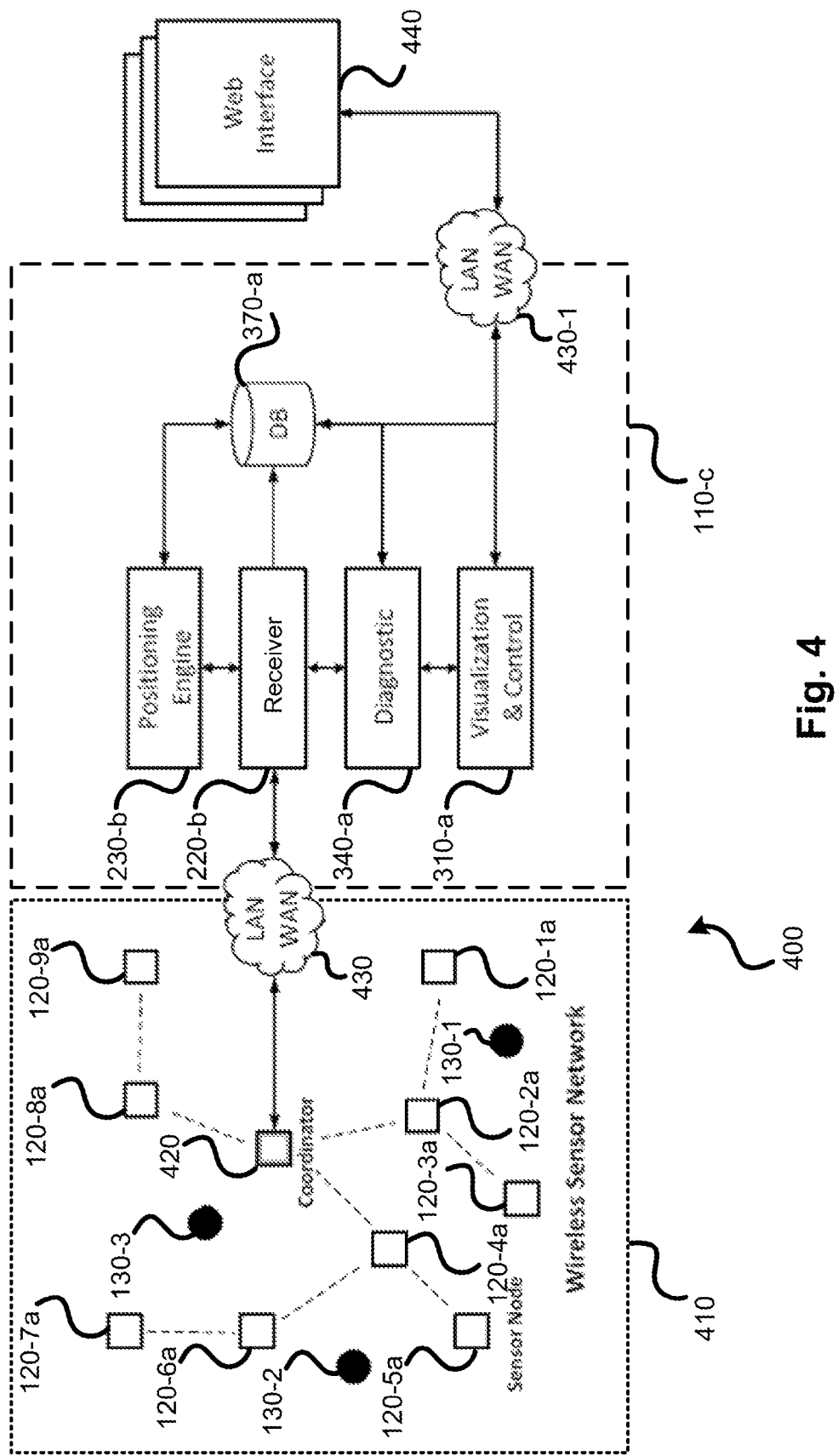
FIG. 4 illustrates a wireless sensor network in communication with a server computer system.

FIG. 4 illustrates a system 400 with a wireless sensor network in communication with a server computer system 110-c. Wireless sensor network 410 may include a number of sensor nodes. Nine sensor nodes are depicted in FIG. 4: sensor node 120-1a through sensor node 120-9a. Sensor nodes 120-1a through 120-9a may represent the same sensor nodes as sensor nodes 120-1 through 120-n of FIG. 1 and may perform substantially the same functions, or sensor nodes 120-1a through 120-9a may represent some other sensor nodes. The dotted paths between sensor nodes may illustrate each sensor node's communication path to server computer system 110-c. As can be seen, in the example illustrated in FIG. 4, some sensor nodes communicate via other sensor nodes, for example, sensor node 120-1a communicates with sensor node 120-2a, which in turn relays the communications from sensor node 120-1a to coordinator 420.

Coordinator 420 may be a sensor node and may perform all of the functionalities of other sensor nodes, such as those described in relation to FIG. 1. Coordinator 420 may perform additional functions. Instead of each sensor node communicating directly with computer system 110-c, the sensor nodes may communicate with coordinator 420, with only coordinator 420 communicating with server computer system 110-c. Coordinator 420 may store RSS measurements and associations between sensor nodes and anchor locations received from sensor nodes 120-1a through 120-9a for a period of time before transferring to server computer system 110-c. Coordinator 420 may communicate with server computer system 110-c via a wireless connection, or may use a wired connection. If a wired connection, the coordinator 420 may communicate with server computer system 110-c using one or more power lines, possibly using a power line modem. By communicating via a power line, the transmissions from coordinator 420 may be less likely to interfere with the wireless transmissions from sensor nodes 120-1a through 120-9a. Coordinator 420 may also communicate with server computer system 110-c via a local area network or wide area network 430. Such networks may be either wired or wireless.

In system 400, three wireless devices are shown as being tracked by wireless sensor network 410: 130-1, 130-2, and 130-3. These wireless devices may represent the same type of wireless device as wireless device 130 of FIG. 1, or may represent some other wireless device.

Server computer system 110-c may represent server computer system 110, 110-a, or 110-b of FIGS. 1-3, respectively. Alternatively, server computer system 110-c may represent some other server computer system. Similarly, positioning engine 230-b, receiver 220-b, diagnostic 340-a, database 370-a, and visualization and control 310-a may perform the same function as positioning engine 230-a, receiver 220-a, diagnostics 340, database 370, and visualization and control 310, respectively, of FIG. 3.

Server computer system 110-c may communicate with a user (external) interface via a network 430-1, such as a local area network or wide area network. Network 430-1 may represent the same network as network 430 or some other network. The user interface may be a web interface 440. Web interface 440 may allow a user to view the locations of some or all wireless devices from a variety of devices and/or locations that have web access.

Figure 5:
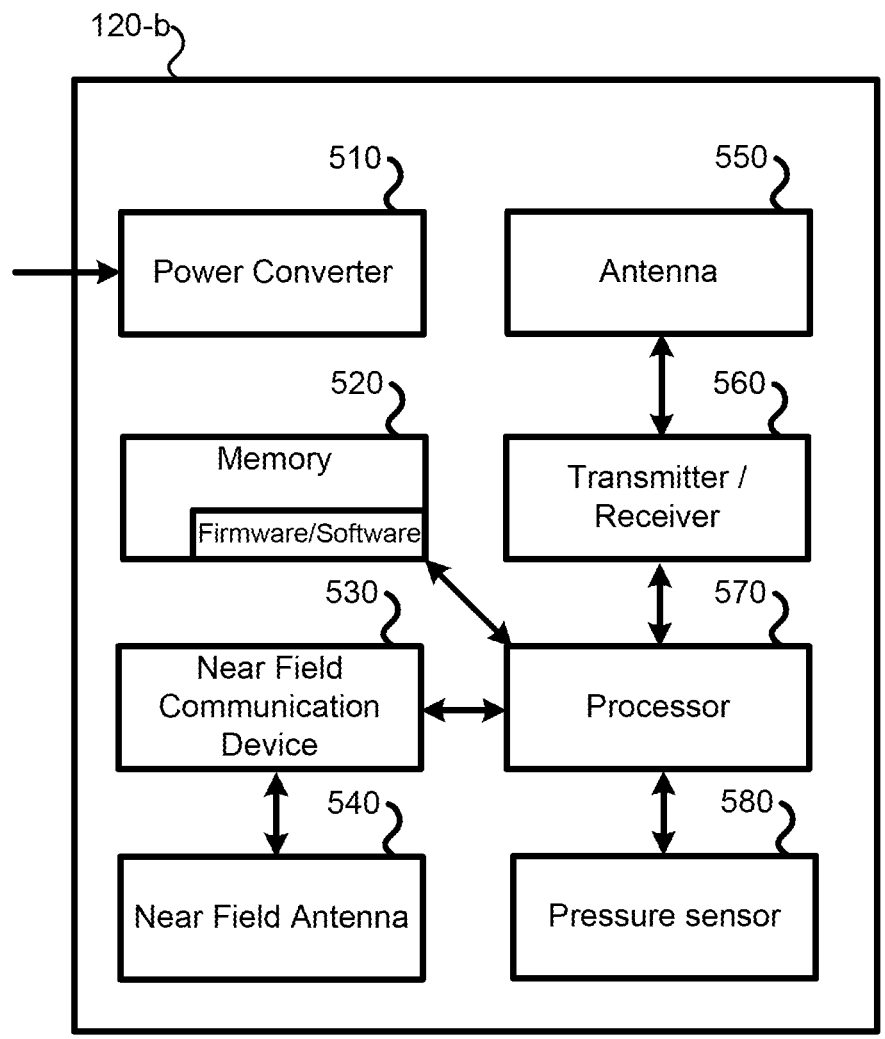
FIG. 5 illustrates a sensor node.

A sensor node may contain various components to allow it to send beaconing signals, measure RSS measurements from other sensor nodes, and transmit RSS measurements and an association with an anchor location with a server computer system (or coordinator). FIG. 5 illustrates an example of sensor node 120-b. Sensor node 120-b may represent sensor node 120 or 120-a of FIGS. 1 and 4, respectively. Alternatively, sensor node 120-b may represent some other sensor node. Sensor node 120-b may contain several components: power converter 510, memory 520, near field communication device 530, near field antenna 540, antenna 550, transmitter/receiver 560, processor 570, and pressure sensor 580.

Power converter 510 may convert an alternating current to a direct current. Power converter 510 may be configured to be plugged directly into a standard electrical outlet. Power converter 510 may provide power for the various components of sensor node 120-b.

Memory 520 may store various firmware or software. Memory 520 may also store data, such as RSS measurements or an association with an anchor module, prior to the data being transmitted to a server computer system (possibly via a coordinator).

Near field communication device 530 and near field antenna 540 may receive an identifier, such as an RFID identifier from an anchor location. Near field communication device 530 may be configured to only receive the identifier when sensor node 120-b initially receives power (e.g., when it is plugged in). As long as it remains powered up, the near field communication device 530 may not receive another identifier from the anchor location. Near field antenna 540 may be specifically suited to the form of near field communications being used. For example, near field antenna 540 may be configured to receive an identifier from an RFID tag.

Transmitter/receiver 560 may be configured to periodically transmit beaconing data via antenna 550. The beaconing data transmitted by transmitter/receiver 560 may include an identifier, such as a MAC address that may be used to identify sensor node 120-b. Transmitter/receiver 560 may also transmit an identifier linked to the anchor location received by the near field communication device 530 via the near field antenna 540 to a server computer system (possibly via a coordinator). This transmission may also contain the MAC address of sensor node 120-b. Some other identifier besides a MAC address may also be used. Transmitter/receiver 560 may also receive a beaconing signal from other sensor nodes. Transmitter/receiver 560 may measure the RSS of the received beaconing signal and store an indicator of what sensor node transmitted the beaconing signal. This data may be stored in memory 520 and/or transmitted to a server computer system (possibly via a coordinator). Additionally, transmitter/receiver 560 may relay data from other sensor nodes to another sensor node, coordinator, or a server computer system.

Processor 570 may be a general purpose processor that interacts with various components of sensor node 120-b. For example, processor 570 may communicate with a transmitter/receiver 560, memory 520, a near field communication device 530, and a pressure sensor 580. Processor 570 may process commands for any of these components.

Pressure sensor 580 may measure the barometric pressure at sensor node 120-b. This feature may be used if sensor nodes are located on multiple floors of a building. Based on the pressure measured by the pressure sensor 580, it may be possible to determine or estimate which floor sensor node 120-b is located on, or at what elevation sensor node 120-b resides. Pressure data gathered by pressure sensor 580 may also be used to compare pressure data gathered by a wireless device. For example, if the pressure measured by a wireless device is substantially similar to the pressure measured by sensor node 120-b using pressure sensor 580, it may be determined that sensor node 120-b and pressure sensor 580 are at the same elevation and/or on the same floor of a building. Pressure data gathered by pressure sensor 580 may be stored in memory 520 and/or may be transmitted to a server computer system by transmitter/receiver 560 via antenna 550.

Figure 6:
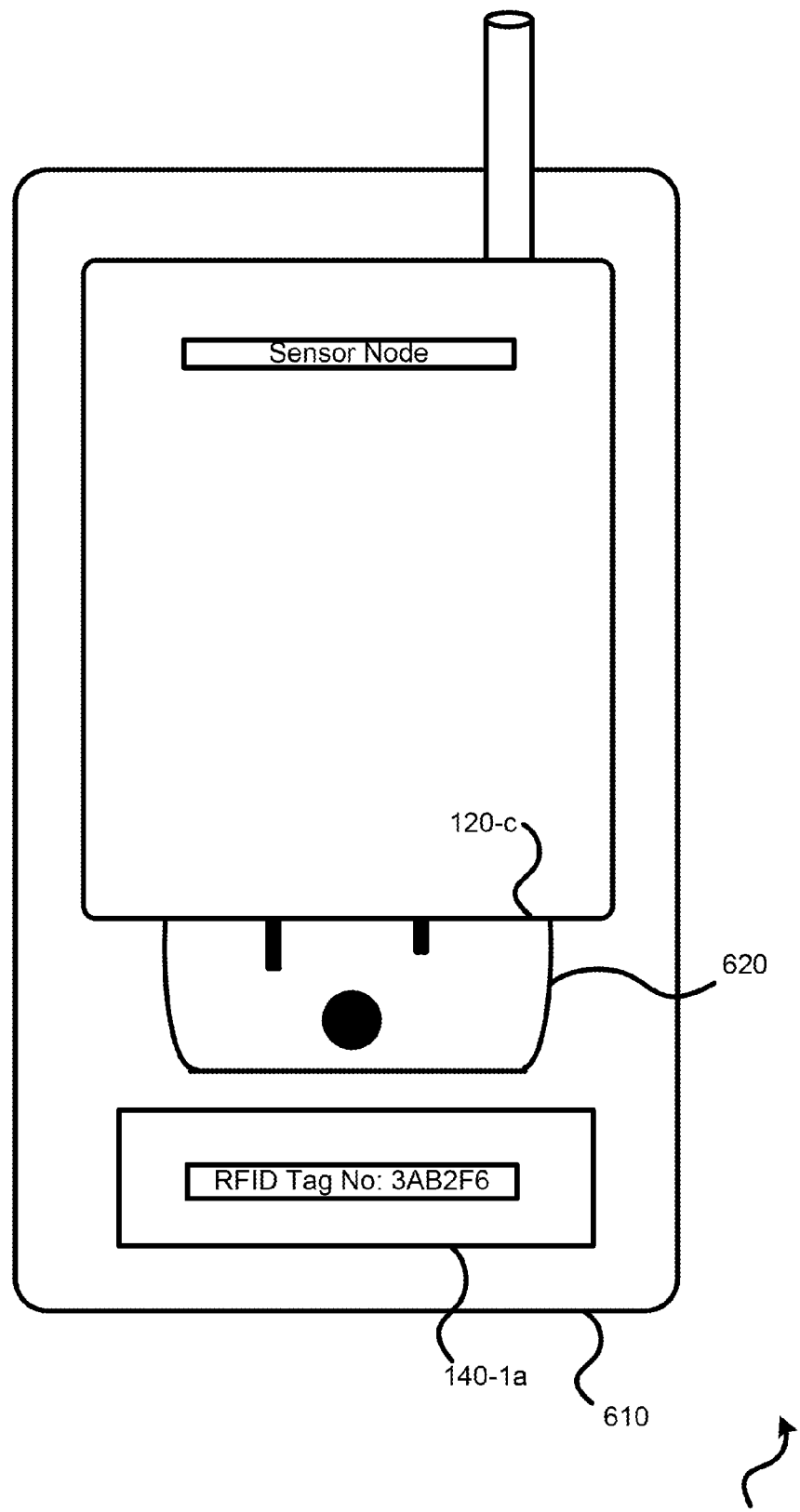
FIG. 6 illustrates a sensor node and anchor location attached to an electrical outlet.

FIG. 6 illustrates an example 600 of a sensor node 120-c plugged into an outlet. Faceplate 610 may be a faceplate of an electrical outlet 620. Electrical outlet 620 may represent a standard electrical outlet. Anchor location 140-1a may be attached directly to the faceplate 610 of electrical outlet 620. Anchor location 140-1a may represent previously described anchor location 140-1 or some other anchor location. Anchor location 140-1a may have an RFID tag identifier linked to it, which sensor node 120-c may read. Anchor location 140-1a may be stuck to faceplate 610 via an adhesive. The adhesive may be intended to be permanent or temporary. While in example 600, anchor location 140-1a is attached directly to faceplate 610, anchor location 140-1a may also be attached between sensor node 120-c and faceplate 610, attached to a wall, or anywhere in the vicinity of sensor node 120-c such that sensor node 120-c may receive anchor location 140-1a's identifier.

Sensor node 120-c may be configured to be attached and supported by outlet 620. Outlet 620 may also supply sensor node 120-c with power. Upon plugging sensor node 120-c into outlet 620, sensor node 120-c may read the RFID tag identifier of anchor location 140-1a. To be clear, sensor node 120-c may represent any of sensor nodes 120, 120-a, or 120-b, as previously described, or may represent some other sensor node.

Figure 7:
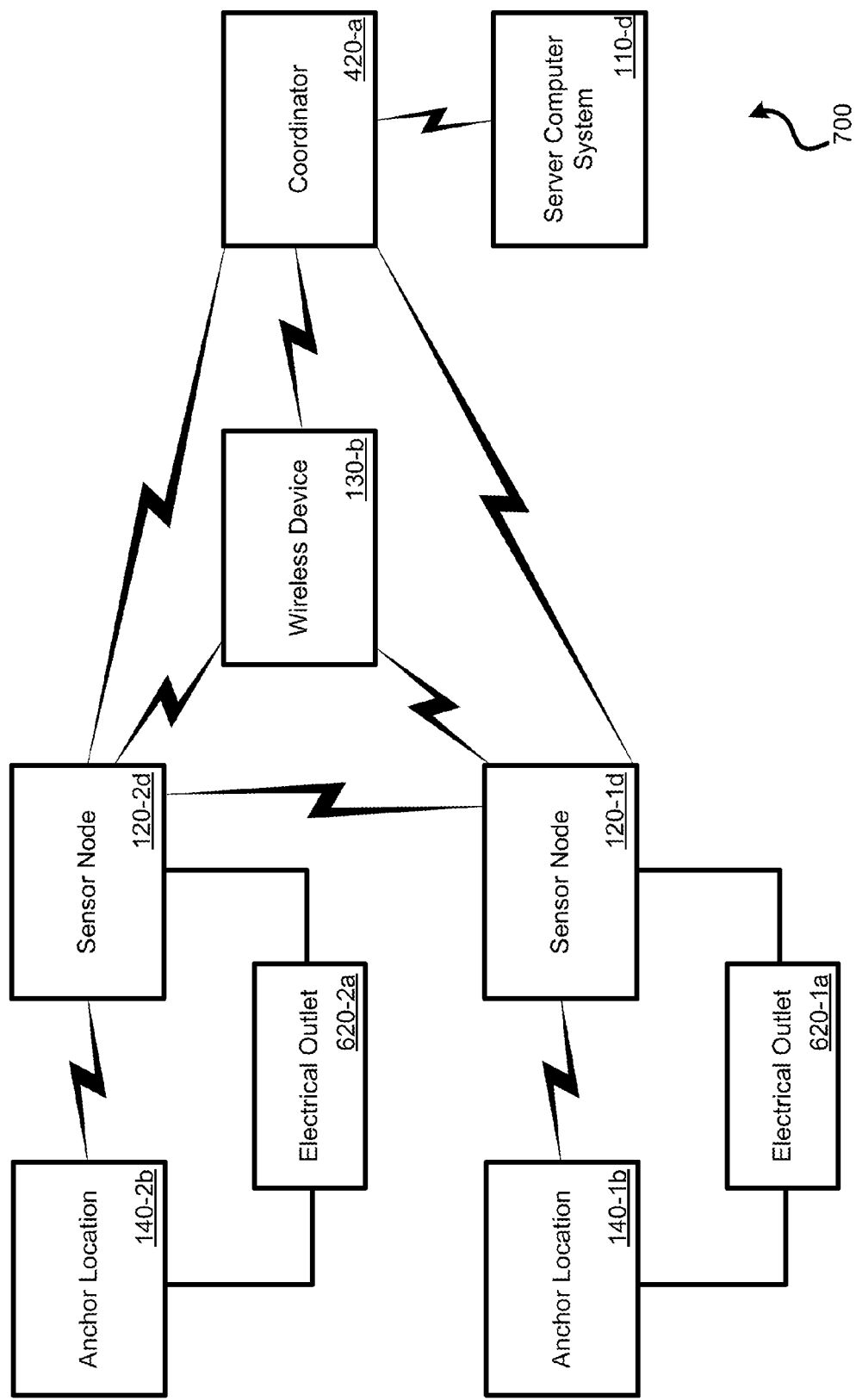
FIG. 7 illustrates a system for determining a physical location of one or more sensor nodes and wireless devices.

FIG. 7 illustrates an example 700 of a wireless sensor network that communicates with a server computer system 110-d. Anchor location 140-1b and sensor node 120-1d may both be attached to electrical outlet 620-1a. Sensor node 120-1d may receive an identifier from anchor location 140-1b wirelessly via a near field communication protocol. Similarly, anchor location 140-2b and sensor node 120-2d may both be attached to electrical outlet 620-2b. Sensor node 120-2d may receive an identifier from anchor location 140-2b wirelessly via a near field communication protocol.

Sensor node 120-2d and sensor node 120-1d may send and receive beaconing signals between each other. Each sensor node may measure RSS measurements from the other sensor node and transmit to coordinator 420-a. Coordinator 420-a may also transmit beaconing signals to sensor nodes 120-2d and 120-1d. Sensor nodes 120-1d and 120-2d may transmit one or more messages to coordinator 420-a that contain an association between each sensor node and its associated anchor location. Such messages may include the sensor node's MAC address and an RFID tag identifier of the associated anchor location. Coordinator 420-a may relay this data to server computer system 110-d.

Wireless device 130-b may receive beaconing signals from sensor node 120-1d, 120-2d, and coordinator 420-a. Wireless device 130-b may make an RSS measurement on each received beaconing signal. The RSS measurements may be transmitted periodically to coordinator 420-a, or directly to server computer system 110-d. In another exemplary system, wireless device 130-b may relay the RSS measurements to server computer system 110-d via a sensor node, such as sensor node 120-2d, and coordinator 420-a. As those with skill in the art will recognize, as opposed to the wireless device 130-b taking RSS measurements on beaconing data transmitted by sensor nodes, another exemplary system may have beaconing data transmitted by wireless device 130-b with each sensor node conducting RSS measurements. These measurements may then be transmitted to the coordinator 420-a and to server computer system 110-d. Also, if wireless device 130-b is not moving, it may enter a sleep or suspend mode to preserve battery power.

Figure 8:
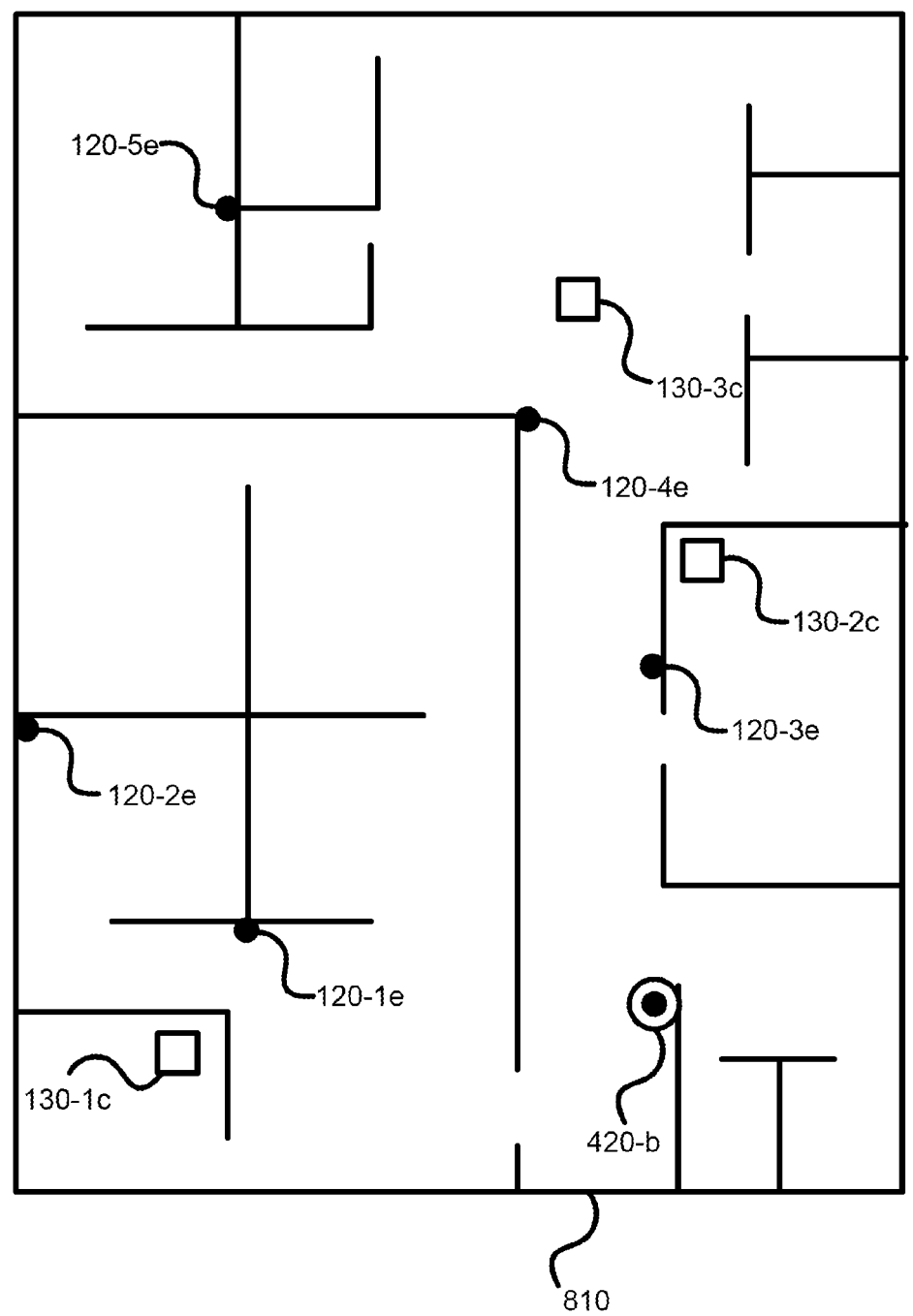
FIG. 8 illustrates a floor plan with wireless devices and sensor nodes.

FIG. 8 illustrates an example 800 of a floor plan with various sensor nodes (120-1e through 120-5e) located throughout the floor plan. A similar floor plan showing the location of wireless devices (130-1c through 130-3c) may be created by a server computer system and displayed to a user using a physical layout (e.g., a floor plan of a physical area), a mapping that associates anchor locations with sensor nodes, and RSS measurements of beaconing data from sensor nodes received at wireless devices 130-1c through 130-3c. At each sensor node, an anchor location may be present. Further, additional anchor locations may be scattered throughout floor 810. Such anchor locations may be used if any of sensor nodes 120-1e through 120-5e are relocated. Coordinator 420-b may receive data from wireless devices 130-1c through 130-3c and/or sensor nodes 120-1c through 120-3c to be relayed to a server computer system. The server computer system may be located in some other location.

Figure 9:
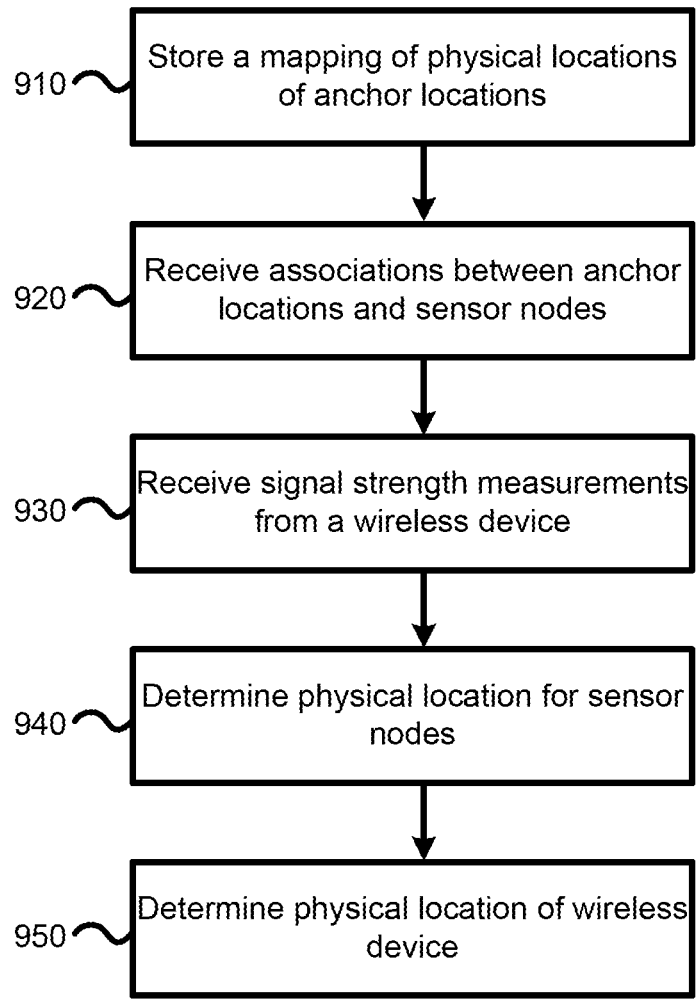
FIG. 9 illustrates a flowchart of how a server computer system may determine the location of sensor nodes and wireless devices.

FIG. 9 illustrates a flowchart 900 of how a server computer system (such as server computer system 110, 110-a, 110-b, 110-c, or 110-d of FIGS. 1-4 and 7, respectively) may determine the location of sensor nodes and wireless devices. At stage 910, a mapping of the physical locations of anchor locations may be stored. This may involve a user entering or selecting locations on a map that indicate where anchor locations are, and the identifier associated with each anchor location. Such a mapping may also be electronically loaded to the server computer system from a stored file.

At stage 920, the computer system may receive associations between anchor locations and sensor nodes. These associations may be transmitted to the server computer system in the form of wireless messages from a coordinator (or via a power line), or directly from sensor nodes. The associations may contain an identifier that identifies an anchor location. This identifier may be an RFID tag identifier. The associations may also contain an identifier that identifies the sensor node. This identifier may be a MAC address.

At stage 930, signal strength measurements may be received by the server computer system from a wireless device. These signal strength measurements may represent the strength of beaconing signals received by the wireless device from sensor nodes. These signal strength measurements may be RSS measurements. The beaconing data received by the wireless device may also indicate the sensor node transmitting the beaconing signal. The signal strength measurements may be accompanied by an identifier that identifies the wireless device, such as a MAC address or some other form of identifier, and an identifier, such as a MAC address, that identifies the one or more sensor nodes that transmitted the beaconing data the RSS measurements were based on. The signal strength measurements may be transmitted directly from the wireless device to the server computer system, via a coordinator, or to a sensor node. The coordinator and/or sensor node may then relay the signal strength measurements to the server computer system.

At stage 940, the server computer system may determine the physical location of sensor nodes. The physical location of sensor nodes may be determined for each sensor node based on each anchor location associated with the respective sensor node. The server computer system may have stored, from stage 910, the physical location of anchor locations. Based on what anchor location a sensor node identifies as being associated with at stage 920, the server computer system may determine the location of the sensor node. Therefore, the location of the sensor node may be determined to be the same location as the anchor location that it is associated with at stage 920.

At stage 950, the location of the wireless device may be determined. The server computer system may use the known location of the sensor nodes and the received signal strength measurements received from the wireless device by the server computer system at stage 930 to determine or estimate the location of the wireless device. The physical location of the wireless device may be determined in real time or substantially in real time. For instance, by the time the physical location of the wireless device is determined at stage 950, it may be expected that the wireless device will still be at the same physical location or nearby the same physical location.

Figure 10A:
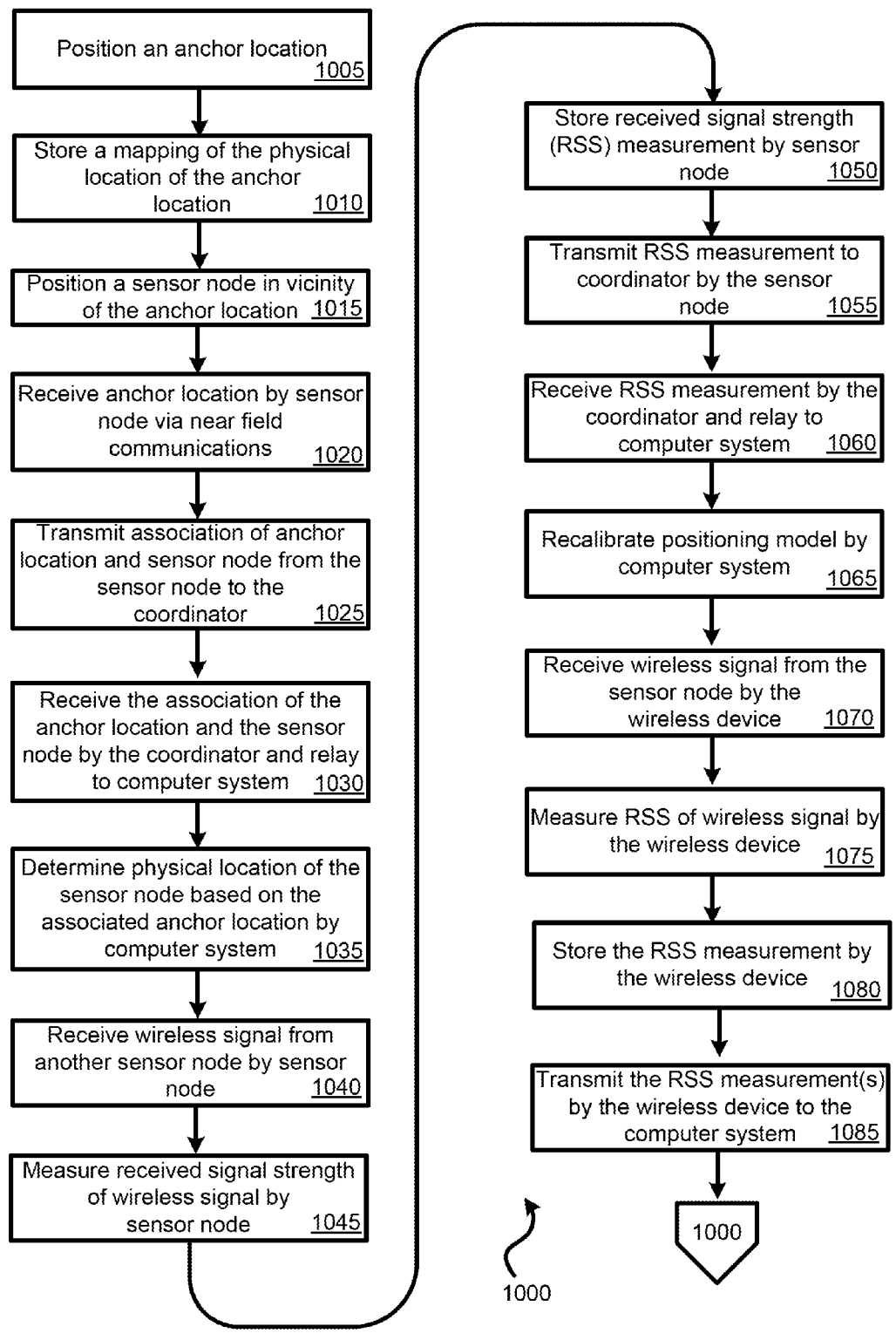
FIGS. 10A and 10B illustrate a flowchart of how a system may determine the location of sensor nodes and wireless devices.
Figure 10B:
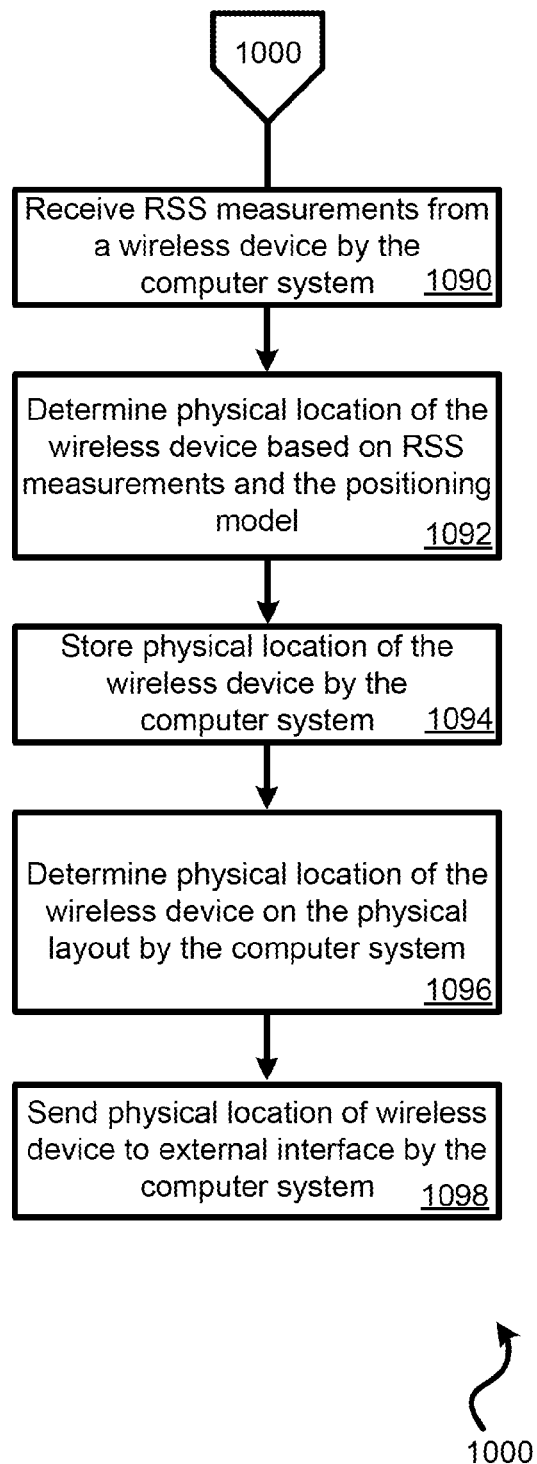

While FIG. 9 focuses on stages conducted at the server computer system, FIGS. 10A and 10B illustrate a system-wide method 1000 which may be performed using anchor locations, sensor nodes, wireless devices, and a server computer system. Method 1000 may be performed using any of the previously described wireless devices, sensor nodes, anchor locations, and server computer systems described herein. Alternatively, method 1000 may be performed using other forms of wireless devices, sensor nodes, anchor locations, and server computer systems.

At stage 1005 (on FIG. 10A), anchor locations may be positioned. Anchor locations, which may be in the form of RFID tags coupled with some device to attach the RFID to another object, such as adhesive, glue, Velcro, or a nail, may be distributed throughout an area where wireless devices are desired to be tracked. In some instances, this may involve attaching anchor locations to each electrical outlet in a building. Or, anchor locations may only be attached to electrical outlets where sensor nodes may be attached at some point in the future.

At stage 1010, a mapping of the physical location of each anchor location may be stored at the server computer system. As anchor locations are being positioned, a user may record the RFID tag identifier (or, possibly, some other identifier) and the physical location the anchor location is being attached to. All, or some portion, of the anchor locations placed throughout the area where wireless devices are desired to be tracked may be linked to a physical location in the mapping of physical locations. This mapping may be stored by the server computer system or may be remotely accessible by the server computer system (such as via a network).

At stage 1015, sensor nodes may be positioned in the vicinity of some or all of the positioned anchor locations. For example, if the anchor locations were attached to electrical outlets, positioning sensor nodes in the vicinity of the anchor locations may involve plugging sensor nodes into the outlets where the anchor locations are attached. If a near field communication protocol other than RFID is used that allows for increased signal transmission strength, it may be possible to increase the distance between an anchor location and its respective sensor node. In some instances, the greater the number of sensor nodes used, the greater the accuracy with which the position of wireless devices may be determined.

At stage 1020, following a sensor node being positioned, the sensor node may receive an identifier (such as an RFID identifier or some other form of identifier) from the anchor location in its vicinity. This may occur following the sensor node being plugged into an electrical outlet or otherwise provided power. In another exemplary sensor node, the sensor node may periodically receive an identifier from an anchor location in its vicinity. Also, the sensor node may store the identifier received from the anchor location.

At stage 1025, an association may be transmitted by the sensor node to a coordinator (or directly to the server computer system). The association may contain the anchor location identifier and an identifier linked to the sensor node (such as a MAC address). This association may be transmitted as one message or as a series of messages. Further, this association may be transmitted only upon some condition occurring, such as the sensor node receiving power, or may occur periodically, such as once per hour. These one or more messages may be transmitted to the coordinator wirelessly.

At stage 1030, the association transmitted by the sensor node may be received by the coordinator. The coordinator may store the association received from the sensor node. The coordinator may transmit the association to the server computer system. This may occur wirelessly, such as using the same wireless network the sensor node used to transmit the association to the coordinator, or may occur via some other network. For example, the coordinator may be wired to a local area network or may use a power line modem to communicate with the server computer system using one or more power lines.

At stage 1035, the physical location of the sensor node may be determined by the server computer system based on the anchor location indicated in the association. Using the mapping stored at stage 1010, the server computer system may determine the physical location of the sensor node based on the association containing the identifier linked to the sensor node and the identifier linked to the anchor location. In an exemplary server computer system, the identifier of the anchor location may be looked up in the mapping, which may be in the form of a database or table. In the mapping, the identifier of the anchor location may be linked to a physical location, such as a position on a map, floor layout, or a set of coordinates. The physical location of the sensor node may be stored by the server computer system in the same or a different database or mapping.

At stage 1040, a wireless signal may be received by the sensor node from some other sensor node. This wireless signal may be a beaconing signal. Each sensor node may periodically transmit a beaconing signal. Beaconing signals may include an identifier linked to the sensor node transmitting the beaconing signal, such as a MAC address.

At stage 1045, the sensor node may measure the received signal strength (RSS) of the wireless signal (e.g., beaconing signal) received from some other sensor node. At stage 1050, the sensor node may store the RSS measurement for a period of time. At stage 1055, the RSS measurement may be transmitted to the coordinator (or directly to the server computer system) by the sensor node. The sensor node may transmit more than one RSS measurement at a time, possibly for more than one sensor node.

At stage 1060, the RSS measurement(s) transmitted by the sensor node may be received by the coordinator. The coordinator may store the RSS measurement(s) for a period of time. The coordinator may then transmit the RSS measurement(s) received from the sensor node to the server computer system. The coordinator may transmit RSS measurements received from other sensor nodes to the server computer system at the same time.

At stage 1065, a positioning model stored by the server computer system may be updated based upon the RSS measurements. Such a positioning model may allow for the physical position of a wireless device to be determined with greater accuracy. The positioning model may be used to determine distances from the sensor nodes to the wireless device based on the RSS measurements.

At stage 1070, a wireless device may receive a wireless signal from a sensor node. This wireless signal may be a beaconing signal, which may be the same signal or in the same form of the wireless signal received at stage 1040. Likewise, this wireless signal may contain an identifier that identifies the sensor node that transmitted the wireless signal, such as a MAC address. At stage 1075, the RSS of the wireless signal may be measured by the wireless device. At stage 1080, the RSS measurement may be stored by the wireless device along with the identifier that identifies the sensor node that transmitted the wireless signal. At stage 1085, the RSS measurement may be transmitted to the server computer system (possibly via a coordinator). The RSS measurement may be transmitted alone or along with other RSS measurements made by the wireless device based on the wireless signal from the same or a different sensor node. The RSS measurement(s) transmitted by the wireless device to the server computer system may contain an identifier that identifies the wireless device transmitting the RSS measurement(s), such as a MAC address, or some other identifier. Additional information may also be transmitted by the wireless device, such as a pressure measurement and/or an accelerometer measurement.

Continuing with method 1000 on FIG. 10B, at stage 1090, the RSS measurements may be received from the wireless device by the server computer system. These RSS measurements may be received by the server computer system directly from the wireless device or via a coordinator. If received from a coordinator, the coordinator may transmit RSS measurements from multiple wireless devices at the same time.

At stage 1092, the physical location of the wireless device may be determined by the server computer system. The server computer system may use the RSS measurements received from the wireless device, the positioning model, and/or the determined physical locations of the sensor nodes to determine where the wireless device is located. The server computer system may also use historical location data about the wireless device to determine its location. For example, if the wireless device is attached to a file cabinet and the fifty previous measurements indicate the wireless device has not moved, if the latest measurement shows movement of a short distance, it may be assumed that the movement is an error and that the wireless device has not moved.

At stage 1094, the physical location of the wireless device may be stored by the server computer system. The physical location of the wireless device may be stored in a database. For example, the creation of a database of historical physical locations may be useful to determine where the wireless device has travelled over a period of time. If the wireless device is associated with a user, it may be useful to determine how much time she spends wandering the halls, walking, running, standing, in the restroom, etc. If the wireless device is attached to an object, such as a computer, it may be useful to use the historical physical locations to determine who has previously had possession of the computer.

At stage 1096, the computer system may determine the physical location of the wireless device on a physical layout of the physical area where the anchor locations were positioned. This may involve determining the location of the wireless device on a floor plan or some other map of a location.

At stage 1098, the physical location of the wireless device may be sent to an external interface by the server computer system. This may allow a user to view where the wireless device is located. For example, an external interface may be a web interface, allowing a user to view the location of the wireless device (possibly on the physical layout) using a web-enabled device, such as a computer connected to the Internet or a web-enabled cellular phone.

Considerations Regarding the Description

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing a thorough understanding of the described techniques. These techniques, however, may be practiced without these specific details. In some instances, well-known structures and devices are shown in stage diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks, servers, and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media include both computer storage media and communication media including any medium that facilitates transfer of a computer program from one place to another. A storage medium may be any available medium that can be accessed by a general-purpose or special-purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure, the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A server computer system for determining a physical location of a wireless device, the system comprising:
   memory configured to store a mapping of physical locations of a plurality of anchor locations;
   a receiver configured to:
   receive a plurality of associations between each of at least a subset of the mapped anchor locations and selected sensor nodes of a plurality of sensor nodes, wherein each sensor node uses near field communications to identify the associated anchor location; and
   receive signal strength measurements from the wireless device measuring the signal strength at the wireless device of wireless transmissions sent to the wireless device from the selected sensor nodes, the wireless device comprising a wireless device receiver and a wireless device transmitter and configured to disable the wireless device receiver and the wireless device transmitter at least when the wireless device is motionless so that the wireless device wirelessly transmits, only when the wireless device is in motion, the signal strength measurements to the server computer system, wherein the selected sensor nodes are further configured to receive, from the respective anchor locations associated with the selected sensor nodes, the near field communications to identify the respective anchor locations; and a positioning engine, communicatively coupled with the memory and the receiver, and configured to:

determine a physical location for each of the selected sensor nodes based at least in part on the mapping; and utilize the received signal strength measurements with the determined physical locations of the selected sensor nodes to determine the physical location of the wireless device.

2. The server computer system of claim 1, wherein the positioning engine is further configured to track the physical location of the wireless device from a first physical location to a second physical location.

3. The server computer system of claim 1, further comprising an external interface configured to output the physical location of the wireless device determined by the positioning engine substantially in real time.

4. The server computer system of claim 1, further comprising an external interface configured to output the physical location of the wireless device positioned on a layout of a physical area, wherein each of the physical locations of the plurality of anchor locations are linked to a location on the layout of the physical area.

5. The server computer system of claim 1, wherein the near field communications utilize an RFID tag to identify the associated anchor location.

6. The server computer system of claim 1, wherein the server computer system is in communication with a coordinator module configured to receive the plurality of associations between each of at least the subset of the mapped anchor locations and selected sensor nodes of the plurality of sensor nodes from the selected sensor nodes.

7. The server computer system of claim 6, wherein the plurality of associations between each of at least the subset of mapped anchor locations and selected sensor nodes of the plurality of sensor nodes are transmitted by the coordinator module to the receiver module via at least one power line.

8. The server computer system of claim 1, wherein the receiver module is further configured to receive elevation measurements from the wireless device.

9. The server computer system of claim 1, wherein the plurality of anchor locations are coupled with electrical outlets and the plurality of sensor nodes are configured to be plugged into electrical outlets.

10. A method of determining physical locations of sensor nodes, the method comprising:

storing, by a computer system, a mapping of physical locations of a plurality of anchor locations;

receiving, by the computer system, a plurality of associations between each of at least a subset of the mapped anchor locations and selected sensor nodes of a plurality of sensor nodes, wherein each sensor node uses near field communications to identify the associated anchor location;

receiving, by the computer system, signal strength measurements from a wireless device measuring the signal strength at the wireless device of wireless transmissions sent to the wireless device from the selected sensor nodes, the wireless device comprising a wireless device receiver and a wireless device transmitter and configured to disable the wireless device receiver and the wireless device transmitter at least when the wireless device is motionless so that the wireless device wirelessly transmits, only when the wireless device is in motion, the signal strength measurements to the computer system, wherein the selected sensor nodes are further configured to receive, from the respective anchor locations associated with the selected sensor nodes, the near field communications to identify the respective anchor locations; and determining, by the computer system, a physical location for each of the selected sensor nodes based on the mapping.

11. The method of claim 10, further comprising tracking the physical location of the wireless device from a first physical location to a second physical location.

12. The method of claim 10, further comprising outputting the physical location of the wireless device determined by the positioning engine substantially in real time.

13. The method of claim 10, further comprising outputting the physical location of the wireless device positioned on a layout of a physical area, wherein each of the physical locations of the plurality of anchor locations is linked to a location on the layout of the physical area.

14. The method of claim 10, wherein the near field communications utilize an RFID tag to identify the associated anchor location.

15. The method of claim 10, further comprising receiving the plurality of associations between each of at least the subset of the mapped anchor locations and selected sensor nodes of the plurality of sensor nodes from the selected sensor nodes.

16. The method of claim 15, wherein the plurality of associations between each of at least the subset of mapped anchor locations and selected sensor nodes of the plurality of sensor nodes are transmitted via at least one power line.

17. The method of claim 10, further comprising receiving elevation measurements from the wireless device.

18. The method of claim 17, further comprising receiving barometric sensor measurements from a subset of the plurality of sensor nodes, wherein the subset of nodes have barometric pressure sensors to establish a reference elevation measurement for use with the received elevation measurements.

19. A computer program product residing on a processor-readable non-transitory storage medium and comprising processor-readable instructions configured to cause a processor to:

store a mapping of physical locations of a plurality of anchor locations;

receive a plurality of associations between each of at least a subset of the mapped anchor locations and selected sensor nodes of a plurality of sensor nodes, wherein each sensor node uses near field communication to identify the associated anchor location;

receive signal strength measurements from a wireless device measuring the signal strength at the wireless device of wireless transmissions sent to the wireless device from the selected sensor nodes, the wireless device comprising a wireless device receiver and a wireless device transmitter and configured to disable the wireless device receiver and the wireless device transmitter at least when the wireless device is motionless so that the wireless device wirelessly transmits, only when the wireless device is in motion, the signal strength measurements to the processor, wherein the selected sensor nodes are further configured to receive, from the respective anchor locations associated with the selected sensor nodes, the near field communications to identify the respective anchor locations;

determine a physical location for each of the selected sensor nodes based on the mapping; and determine a physical location of the wireless device, wherein the determination utilizes the received signal strength measurements with the determined physical locations of the selected sensor nodes.

20. The computer program product of claim 19, further comprising processor-readable instructions configured to cause the processor to track the physical location of the wireless device from a first physical location to a second physical location.

21. The computer program product of claim 19, further comprising processor-readable instructions configured to cause the processor to output the physical location of the wireless device determined by the positioning engine substantially in real time.

22. The computer program product of claim 19, further comprising processor-readable instructions configured to cause the processor to output the physical location of the wireless device positioned on a layout of a physical area, wherein each of the physical locations of the plurality of anchor locations are linked to a location on the layout of the physical area.

23. The computer program product of claim 19, wherein the near field communications utilize an RFID tag to identify the associated anchor location.

24. The computer program product of claim 19, further comprising processor-readable instructions configured to cause the processor to receive the plurality of associations between each of at least the subset of the mapped anchor locations and selected sensor nodes of the plurality of sensor nodes from the selected sensor nodes.

25. The computer program product of claim 19, further comprising processor-readable instructions configured to cause the processor to receive elevation measurements from the wireless device.

26. A computing device for determining a physical location of a wireless device, the computing device comprising:
    means for storing a mapping of physical locations of a plurality of anchor locations;
    means for receiving a plurality of associations between each of at least a subset of the mapped anchor locations and selected sensor nodes of a plurality of sensor nodes, wherein each sensor node uses near field communication to identify the associated anchor location;
    means for receiving signal strength measurements from the wireless device measuring the signal strength at the wireless device of wireless transmissions sent to the wireless device from the selected sensor nodes, the wireless device comprising a wireless device receiver and a wireless device transmitter and configured to disable the wireless device receiver and the wireless device transmitter at least when the wireless device is motionless so that the wireless device wirelessly transmits, only when the wireless device is in motion, the signal strength measurements to the computing device, wherein the selected sensor nodes are further configured to receive, from the respective anchor locations associated with the selected sensor nodes, the near field communications to identify the respective anchor locations;
    means for determining a physical location for each of the selected sensor nodes based on the mapping; and
    means for determining the physical location of the wireless device, wherein the determination utilizes the received signal strength measurements with the determined physical locations of the selected sensor nodes.

27. The computing device of claim 26, further comprising means for tracking the physical location of the wireless device from a first physical location to a second physical location.

28. The computing device of claim 26, further comprising means for outputting the physical location of the wireless device determined by the positioning engine substantially in real time.

29. The computing device of claim 26, further comprising means for outputting the physical location of the wireless device positioned on a layout of a physical area, wherein each of the physical locations of the plurality of anchor locations is linked to a location on the layout of the physical area.

30. The computing device of claim 26, further comprising means for receiving the plurality of associations between each of at least the subset of the mapped anchor locations and selected sensor nodes of the plurality of sensor nodes from the selected sensor nodes.

31. The computing device of claim 26, further comprising:
    means for receiving pressure sensor measurements from the wireless device and from a subset of the plurality of sensor nodes; and
    means for calculating elevation measurements using the received measurements.

32. The computing device of claim 26, wherein the plurality of anchor locations coupled with electrical outlets and the plurality of sensor nodes are configured to be plugged into electrical outlets.

33. A system for determining a physical location of a wireless device, the system comprising:
    a plurality of sensor nodes, wherein each sensor node of the plurality of sensor nodes is configured to:
    identify an associated anchor location using near field communications;
    transmit an association between a mapped anchor location and the sensor node to a computer system; and
    transmit wireless transmissions to the wireless device;
    the wireless device, comprising a wireless device receiver and a wireless device transmitter and configured to:
    disable the wireless device receiver and the wireless device transmitter at least when the wireless device is motionless;
    receive wireless transmissions from selected sensor nodes of the plurality of sensor nodes only when the wireless device is in motion; and
    wirelessly transmit, only when the wireless device is in motion, signal strength measurements, to the computer system measuring the signal strength at the wireless device of wireless transmissions from the selected sensor nodes; and
    the computer system, configured to:
    store a mapping of physical locations of the plurality of anchor locations;
    receive a plurality of associations between each of at least a subset of the mapped anchor locations and selected sensor nodes of the plurality of sensor nodes;
    receive the signal strength measurements from the wireless device measuring the signal strength at the wireless device of wireless transmissions from the selected sensor nodes;
    determine a physical location for each of the selected sensor nodes based on the association between the mapped anchor location and the sensor node; and determine the physical location of the wireless device, wherein the determination utilizes the received signal strength measurements and the determined physical locations of the selected sensor nodes.

34. The system of claim 33, wherein a positioning engine of the computer system is further configured to track the physical location of the wireless device from a first physical location to a second physical location.

35. The system of claim 33, wherein the computer system further comprises an external interface configured to output the physical location of the wireless device determined by the positioning engine substantially in real-time.

36. The system of claim 33, wherein the computer system further comprises an external interface configured to output the physical location of the wireless device positioned on a layout of a physical area, wherein each of the physical locations of the plurality of anchor locations is linked to a location on the layout of the physical area.

37. The system of claim 33, wherein the near field communications utilize an RFID tag to identify the associated anchor location.

38. The system of claim 33, the system further comprising a coordinator module configured to receive the plurality of associations between each of at least the subset of the mapped anchor locations and selected sensor nodes of the plurality of sensor nodes from the selected sensor nodes.

39. The system of claim 38, wherein the plurality of associations between each of at least the subset of mapped anchor locations and selected sensor nodes of the plurality of sensor nodes are transmitted by the coordinator module to the receiver module via at least one power line.

40. The system of claim 33, wherein the receiver module of the computer system is further configured to receive elevation measurements from the wireless device.

41. The system of claim 33, wherein the plurality of anchor locations are electrical outlets and the plurality of sensor nodes are configured to be plugged into electrical outlets.

42. A method of determining physical locations of sensor nodes, the method comprising:
    storing, by a computer system, a mapping of physical locations of a plurality of anchor locations;
    receiving, by the computer system, a plurality of associations between each of at least a subset of the mapped anchor locations and selected sensor nodes of a plurality of sensor nodes, wherein each sensor node uses near field communications to identify the associated anchor location;
    receiving, by the computer system, signal strength measurements from a wireless device measuring the signal strength at the wireless device of wireless transmissions sent to the wireless device from the selected sensor nodes, the wireless device comprising a wireless device receiver and a wireless device transmitter and configured to disable the wireless device receiver and the wireless device transmitter at least when the wireless device is motionless so that the wireless device wirelessly transmits, only when the wireless device is in motion, the signal strength measurements to the computer system, wherein the selected sensor nodes are further configured to receive, from the respective anchor locations associated with the selected sensor nodes, the near field communications to identify the respective anchor locations;
    determining, by the computer system, a physical location for each of the selected sensor nodes based on the mapping; and
    determining, by the computer system, a physical location of the wireless device, wherein the determination utilizes the received signal strength measurements with the determined physical locations of the selected sensor nodes.

\* \* \* \* \*